US012592602B2

(12) United States Patent
Abe et al.

(10) Patent No.: US 12,592,602 B2
(45) Date of Patent: Mar. 31, 2026

(54) COIL WIRE MODULE, SOLDER-INCORPORATED SOLDER JOINTING PART, AND MANUFACTURING METHOD FOR COIL WIRE MODULE

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Tomoki Abe, Yokkaichi (JP); Daisuke Hashimoto, Yokkaichi (JP); Masaharu Suetani, Yokkaichi (JP); Kentaro Tachi, Yokkaichi (JP); Yasushi Tamura, Osaka (JP); Kanzo Ishihara, Osaka (JP); Shintaro Morino, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES. LTD., Osaka (JP)

( * ) Notice: Subject to any disclaimer, the term of this patent is extended or adjusted under 35 U.S.C. 154(b) by 215 days.

(21) Appl. No.: 18/574,962

(22) PCT Filed: Jun. 13, 2022

(86) PCT No.: PCT/JP2022/023614
§ 371 (c)(1),
(2) Date: Dec. 28, 2023

(87) PCT Pub. No.: WO2023/276633
PCT Pub. Date: Jan. 5, 2023

(65) Prior Publication Data
US 2024/0348121 A1 Oct. 17, 2024

(30) Foreign Application Priority Data

Jul. 1, 2021 (JP) .................................. 2021-109963

(51) Int. Cl.
| *H02K 3/50* | (2006.01) |
| *H02K 3/28* | (2006.01) |
| *H02K 15/33* | (2025.01) |

(52) U.S. Cl.
CPC ................. *H02K 3/50* (2013.01); *H02K 3/28* (2013.01); *H02K 15/33* (2025.01); *H02K 2203/09* (2013.01)

(58) Field of Classification Search
CPC ............ H02K 5/225; H02K 3/04; H02K 3/50; H02K 3/52; H02K 15/35; H02K 3/28; H02K 15/33; H02K 2203/09
(Continued)

(56) References Cited

U.S. PATENT DOCUMENTS

| 2008/0136274 A1 | 6/2008 | Fujii et al. |
| 2012/0274162 A1 | 11/2012 | Kleber |
| 2014/0077639 A1 | 3/2014 | Kleber |

FOREIGN PATENT DOCUMENTS

| CN | 209016822 U | 6/2019 |
| EP | 3 952 068 A1 | 2/2022 |
| | (Continued) | |

OTHER PUBLICATIONS

Nakamura Masayuki, Stator Unit Rotary Electric Machine and Manufacturing Method, Nov. 5, 2020, JP 2020181762 (English Machine Translation) (Year: 2020).*
(Continued)

*Primary Examiner* — Alexander A Singh
(74) *Attorney, Agent, or Firm* — OLIFF PLC

(57) ABSTRACT

A coil wire module for a rotating electric machine, the core wire module including: a plurality of coil wires that are
(Continued)

configured to be provided in a core of the rotating electric machine; and a hardened solder, wherein: the plurality of coil wires each have a connection end that is configured to be exposed from an end of the core, and the hardened solder is formed by a solder melting inside a solder hardening space, in a state where at least two of the connection ends of the plurality of coil wires are inserted into the solder hardening space, and hardening to join the at least two of the connection ends together.

6 Claims, 3 Drawing Sheets

(58) Field of Classification Search
     USPC ........................................................... 310/71
     See application file for complete search history.

(56) References Cited

FOREIGN PATENT DOCUMENTS

| | | | |
|---|---|---|---|
| JP | 2008-148479 | A | 6/2008 |
| JP | 2020181762 | A * | 11/2020 |
| JP | 2020-202652 | A | 12/2020 |
| WO | 2001/020755 | A1 | 3/2001 |

OTHER PUBLICATIONS

Aug. 23, 2022 Search Report issued in International Patent Application No. PCT/JP2022/023614.

* cited by examiner

COIL WIRE MODULE, SOLDER-INCORPORATED SOLDER JOINTING PART, AND MANUFACTURING METHOD FOR COIL WIRE MODULE

BACKGROUND

The present disclosure relates to a coil wire module.

JP 2008-148479A discloses TIG (Tungsten Inert Gas) welding a busbar and a rectangular conducting wire with a connection end portion of the rectangular conducting wire inserted into a notch formed in the busbar. A plurality of rectangular conducting wires of an armature are thereby connected to each other via busbars.

SUMMARY

According to the technology disclosed in JP 2008-148479A, the joining end portion of the rectangular conducting wires is inserted into the notch of the busbars, and the busbars and the rectangular conducting wires are then TIG welded, thus making the task of connecting the rectangular conducting wires to each other complex.

In view of this, an exemplary aspect of the disclosure facilitates connection between coil wires.

A coil wire module of the present disclosure is a coil wire module for a rotating electric machine, including a plurality of coil wires that are configured to be provided in a core of the rotating electric machine; and a hardened solder, wherein: the plurality of coil wires each have a connection end that is configured to be exposed from an end of the core, and the hardened solder is formed by a solder melting inside a solder hardening space, in a state where at least two of the connection ends of the plurality of coil wires are inserted into the solder hardening space, and hardening to join the at least two of the connection ends together.

Also, a solder-incorporated solder joint for joining at least two connection ends of a plurality of coil wires that are configured to be provided in a core of a rotating electric machine, the solder joint including: a recess into which the at least two connection ends are insertable; and a solder disposed inside the recess.

Also, a manufacturing method for a coil wire module of the present disclosure includes preparing a solder-incorporated solder joint in which a solder is disposed in a recess; inserting at least two connection ends of a plurality of coil wires that are provided in a core of a rotating electric machine into the recess; and melting the solder in the recess by heat and soldering the at least two connection ends together inside the recess.

According to the present disclosure, connection between coil wires is facilitated.

DETAILED DESCRIPTION OF EMBODIMENTS

Description of Embodiments of Disclosure

Figure 1:
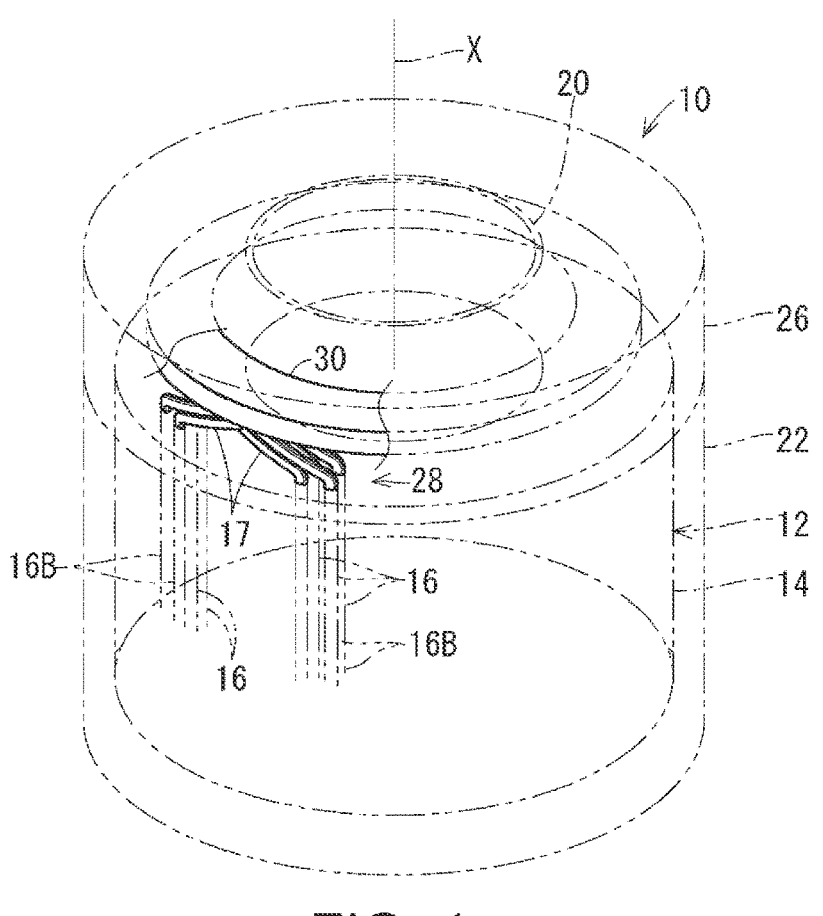
FIG. 1 is a schematic perspective view showing a motor according to one embodiment.

Initially, modes of the present disclosure will be enumerated and described.

A coil wire module of the present disclosure is as follows.

(1) A coil wire module for a rotating electric machine, including a plurality of coil wires that are provided in a core of the rotating electric machine, and a hardened solder portion, the plurality of coil wires each having a connection end portion that is exposed from an end portion of the core, and the hardened solder portion being a portion formed by a solder melting inside a solder hardening space, in a state where at least two of the connection end portions of the plurality of coil wires are inserted into the solder hardening space, and hardening to join the at least two connection end portions together.

With this coil wire module, at least two of the connection end portions are connected by the solder melting inside the solder hardening space and hardening to join the at least two of the connection end portions together. Connection between the coil wires is thus facilitated.

(2) The coil wire module of (1) may further include a solder jointing part having a recessed portion into which a set of at least two of the connection end portions of the plurality of coil wires are insertable, and the hardened solder portion may join the at least two of the connection end portions together inside the recessed portion. In this case, if solder is housed inside the recessed portion and the solder is melted while at least two of the connection end portions are inserted into the recessed portion, connection between the connection end portions is facilitated.

(3) In the coil wire module of (2), a plurality of sets of the at least two connection end portions may be lined up at an interval from each other in a circumferential direction of the core, and, in the solder jointing part, a plurality of the recessed portion may be respectively formed in correspondence with the plurality of sets of at least two connection end portions. In this case, a plurality of recessed portions are formed in the solder jointing part, and thus, when the solder jointing part is moved closer to the coil wires, a plurality of sets of the at least two connection end portions are collectively inserted into the recessed portions.

(4) In the coil wire module of (2) or (3), the solder jointing part may include a cap in which the recessed portion is formed, and a holder in which a set recessed portion capable of holding the cap is formed. In this way, by constituting the cap in which the recessed portion is formed as a separate part from the holder, the cap is easily constituted to be suitable for soldering. For example, by making the cap from metal, the recessed portion is easily formed with an accuracy suitable for inserting and holding the at least two connection end portions. Also, the portion surrounding the recessed portion is easily provided with heat resistance to withstand melting of the solder.

(5) In the coil wire module of any one of (2) to (4), the hardened solder portion may include a portion located between a distal end face of the at least two connection end portions and an innermost portion of the recessed portion. The at least two connection end portions can thereby be connected by a hardened solder portion that includes a portion located in the innermost portion of the recessed portion.

Also, a solder-incorporated solder jointing part of the present disclosure is as follows.

(6) A solder-incorporated solder jointing part for joining at least two connection end portions of a plurality of coil wires that are provided in a core of a rotating electric machine, including a recessed portion into which the at least two connection end portions are insertable and a solder disposed inside the recessed portion.

With this solder-incorporated solder jointing part, when at least two of the connection end portions of the plurality of coil wires are inserted into the recessed portion, and the solder in the recessed portion is heated and melted in this state, the at least two connection end portions can be easily joined by the solder.

A manufacturing method for a coil wire module of the present disclosure is as follows.

(7) A manufacturing method for a coil wire module including preparing a solder-incorporated solder jointing part in which a solder is disposed in a recessed portion, inserting at least two connection end portions of a plurality of coil wires that are provided in a core of a rotating electric machine into the recessed portion, and melting the solder in the recessed portion by heat and soldering the at least two connection end portions together inside the recessed portion.

If at least two connection end portions are inserted into the recessed portion and the solder inside the recessed portion is melted by heat, the at least two connection end portions are thereby easily soldered together inside the recessed portion.

Detailed Description of Embodiments of Disclosure

Specific examples of a coil wire module, a solder jointing part, and a manufacturing method for a coil wire module of the present disclosure will be described below with reference to the drawings. Note that the present disclosure is not limited to these illustrative examples and is defined by the claims, and all changes that come within the meaning and range of equivalency of the claims are intended to be embraced therein.

EMBODIMENT

Hereinafter, a coil wire module, a solder jointing part, and a manufacturing method for a coil wire module according to an embodiment will be described. The coil wire module in a rotating electric machine is a portion in which coil wires of the rotating electric machine are connected to each other. For convenience of description, the overall configuration of a motor 10, which is an example of the rotating electric machine, will be described. FIG. 1 is a schematic perspective view showing the motor 10.

The motor 10 is provided with a stator 12 and a rotor 20. The motor 10 is, for example, a three-phase motor. In the present embodiment, the rotor 20 is configured to rotate about a rotation axis X inside the stator 12. The rotating electric machine may be a generator instead of an electric motor such as the motor 10.

The stator 12 is an armature and is provided with a stator core 14 and a plurality of coil wires 16. The stator core 14 includes a plurality of teeth. The plurality of teeth are provided so as to surround the rotation axis X. Gaps are provided between the teeth around the rotation axis X.

The plurality of coil wires 16 are provided in the stator core 14. The coil wires 16 each include a straight portion 16B disposed between the teeth so as to extend in a direction parallel to the rotation axis X, and a connection end portion 17 exposed from an end portion of the stator core 14. At least two connection end portions 17 are connected to each other on the outer side of the stator core 14 in the axial direction, so as to form a coil having one or more teeth as a core. FIG. 1 shows a plurality of sets of two connection end portions 17 connected to each other upward of the stator core 14. At least two connection end portions may also be connected to each other downward of the stator core 14 in FIG. 1. The at least two coil wires 16 on the outer side of either end of the stator core 14 need not be connected by the same configuration. For example, downward of the stator core 14, two coil wires may be directly joined by being integrally formed. Also, downward of the stator core 14, two coil wires may be connected via a busbar or the like formed by a metal plate or the like.

Due to a plurality of coil wires 16 being connected in predetermined sets on one end side and the other end side of the stator core 14, a coil that produces a magnetic field for rotating the rotor 20 can be produced. The coil wires 16 that are provided in the stator 12 may be wound using a distributed winding method or a concentrated winding method.

The rotor 20 includes a permanent magnet and is provided in a rotatable manner inside the stator 12. Due to the magnetic field that is produced by the stator 12, the rotor 20 rotates about the rotation axis X.

A main body case 22 is provided so as to surround the periphery and other end side of the stator 12. Also, a cover 26 is provided so as to cover the one end side of the stator 12.

Note that the end portions of some of the plurality of coil wires 16 are lead out of the one end portion of the stator 12 and used as end portions to be connected to an external power source. Also, the end portions of the remaining coil wires 16 are lead out of the one end portion of the stator 12 and used as end portions for connecting at a neutral point.

Figure 2:
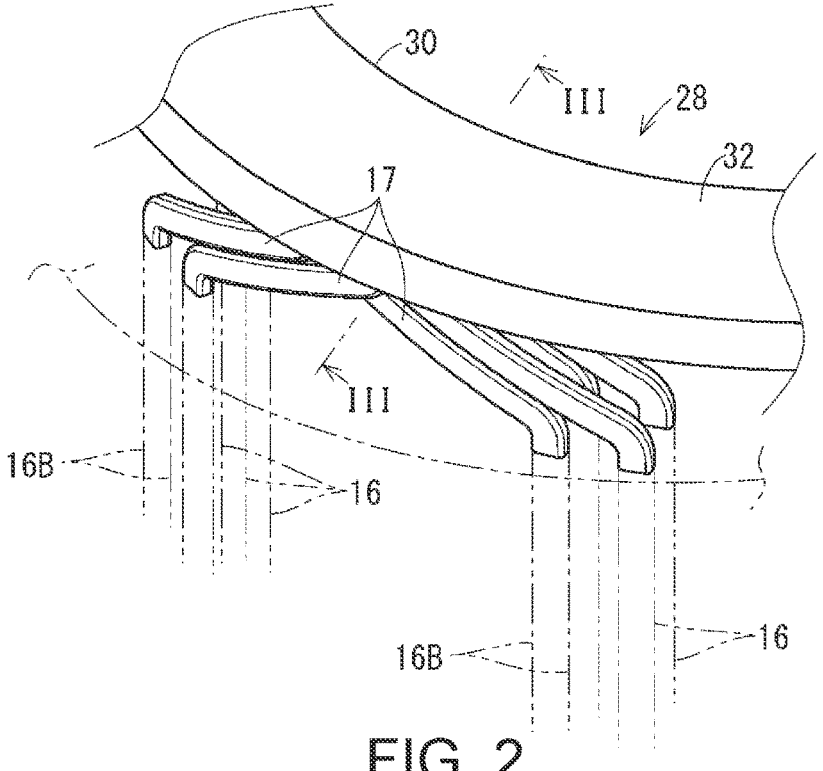
FIG. 2 is a perspective view showing connection portions between two connection end portions.
Figure 3:
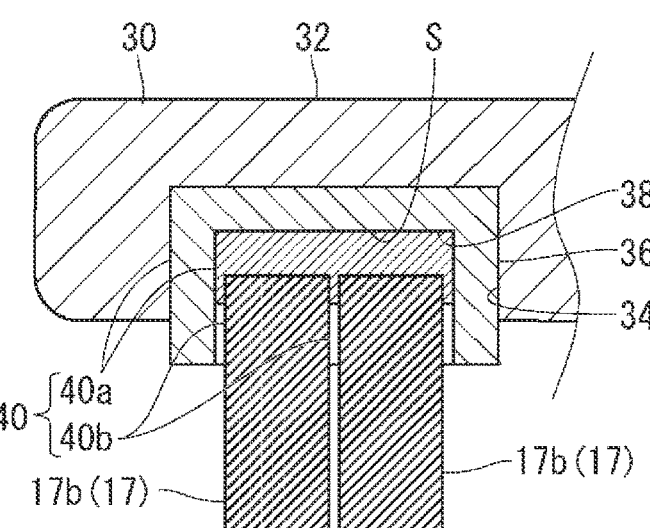
FIG. 3 is a partial cross-sectional view taken along line III-III in FIG. 2.
Figure 4:
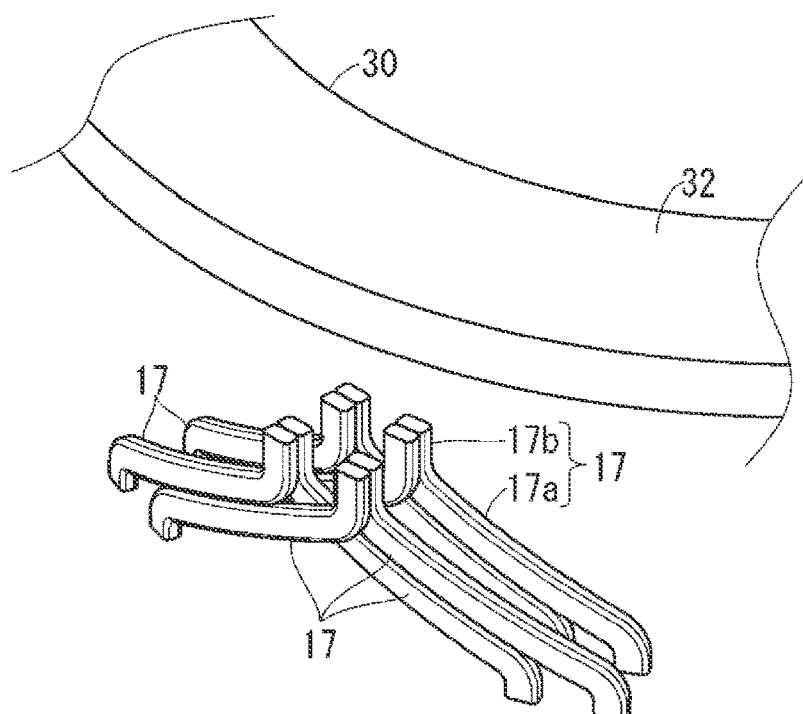
FIG. 4 is an exploded perspective view showing a coil wire module.

A coil wire module 28 in the rotating electric machine will now be described more specifically, focusing on the configuration for connecting two connection end portions 17. FIG. 2 is a perspective view showing connection portions between two connection end portions 17. FIG. 3 is a partial cross-sectional view taken along line III-III in FIG. 2. FIG. 4 is an exploded perspective view showing the coil wire module 28. FIGS. 2 and 4 selectively depict four sets of connection portions.

The coil wire module 28 in the rotating electric machine is provided with the plurality of coil wires 16 and a hardened solder portion 40 (hardened solder). In the present embodiment, the coil wire module 28 is further provided with a solder jointing part 30 (solder joint) having a recessed portion 38 (recess). The hardened solder portion 40 connects at least two coil wires 16 inside the recessed portion 38. The various parts will now be described more specifically.

The coil wires 16 are each formed by, for example, a rectangular conductor whose transverse section (cross section of a plane orthogonal to the extension direction) is rectangular in shape. The corners may also be rounded. The coil wires 16 are made of a metal such as copper or a copper alloy. The coil wires 16 each include the straight portion 16B and the connection end portion 17. The straight portion 16B is disposed in a slot between the teeth in the stator core 14. The straight portion 16B is formed to extend straight in the rotation axis X direction.

The connection end portion 17 is exposed from an end portion of the stator core 14 and extends toward another connection end portion 17 to be connected to. In the present embodiment, coil wires 16 at different positions in the circumferential direction of a circle centered on the rotation axis X are connected to each other. Thus, the connection end portion 17 of one of the two coil wires 16 that are connected to each other includes an inclined portion 17a that proceeds closer to the other coil wire 16 to be connected to in the circumferential direction as it extends further from the end portion of the stator core 14. The inclined portion 17a extends in a direction intersecting the rotation axis X. A straight end portion 17b that extends toward the opposite side to the stator core 14 in the rotation axis X direction is provided at the distal end portion of the inclined portion 17a. Also, the connection end portion 17 of the other coil wire 16 of the two coil wires 16 that are connected to each other includes an inclined portion 17a that proceeds closer to the one coil wire 16 to be connected to in the circumferential direction as it extends further from the end portion of the stator core 14. A straight end portion 17b that extends toward the opposite side to the stator core 14 in the rotation axis X direction is provided at the distal end portion of the inclined portion 17a. The distal end portions of the inclined portions 17a and the straight end portions 17b of two coil wires 16 that are connected to each other are disposed at an intermediate (here, middle) position between the two coil wires 16 in the circumferential direction. Also, the distal end portions of the inclined portions 17a and the straight end portions 17b of the two coil wires 16 can respectively be arranged side by side in the radial direction of a circle centered on the rotation axis X. Note that the longitudinal direction of the transverse section of the coil wires 16 may be in a direction tangential to the circumferential direction. In this case, the contact area between the distal end portions of the inclined portions 17a and between the straight end portions 17b is large.

An insulating coating made of enamel or the like may be formed on the outer periphery of the straight portion 16B. The conductor of the portion of the connection end portion 17 that contacts the other connection end portion 17 is exposed.

For example, an insulating coating made of enamel or the like may be formed over the entirely of the coil wire 16, and the insulating coating may be removed from only the surface of the connection end portion 17 that contacts the other connection end portion 17. The insulating coating of the entire periphery of the connection end portion 17 may also be removed.

In the present embodiment, a plurality of sets of at least two connection end portions 17 are disposed at an interval from each other in the circumferential direction of the stator core 14.

Also, in the present embodiment, a plurality of sets of at least two connection end portions 17 are lined up along a plurality of peripheral paths in the circumferential direction of the stator core 14. Here, a plurality of sets of at least two connection end portions 17 are lined up along two ring-shaped lines consisting of a ring-shaped line on the inner peripheral side and a ring-shaped line on the outer peripheral side. A plurality of sets of at least two connection end portions 17 may also be lined up along three or more ring-shaped lines.

The at least two connection end portions 17 lined up along the inner peripheral ring-shaped line and the at least two connection end portions 17 lined up along the outer peripheral ring-shaped line are provided at the same position in the circumferential direction of the stator core 14. In other words, the at least two connection end portions 17 lined up along the inner peripheral ring-shaped line and the at least two connection end portions 17 lined up along the outer peripheral ring-shaped line are lined up in the radial direction of the stator core 14.

The at least two connection end portions 17 lined up along the inner peripheral ring-shaped line and the at least two connection end portions 17 lined up along the outer peripheral ring-shaped line may be provided at different positions in the circumferential direction of the stator core 14. For example, the at least two connection end portions 17 lined up along the inner peripheral ring-shaped line and the at least two connection end portions 17 lined up along the outer peripheral ring-shaped line may be provided so as to be positioned alternately in the circumferential direction of the stator core 14.

The hardened solder portion 40 is a portion formed by a solder melting inside a solder hardening space S, in a state where at least two connection end portions 17 are inserted into the solder hardening space S, and hardening to join the at least two connection end portions 17 together. Therefore, the hardened solder portion 40 has the same shape as the inner peripheral surface and surface on the far side of the recessed portion 38 that defines the solder hardening space S, or a smaller shape than the aforementioned shape.

Figure 5:
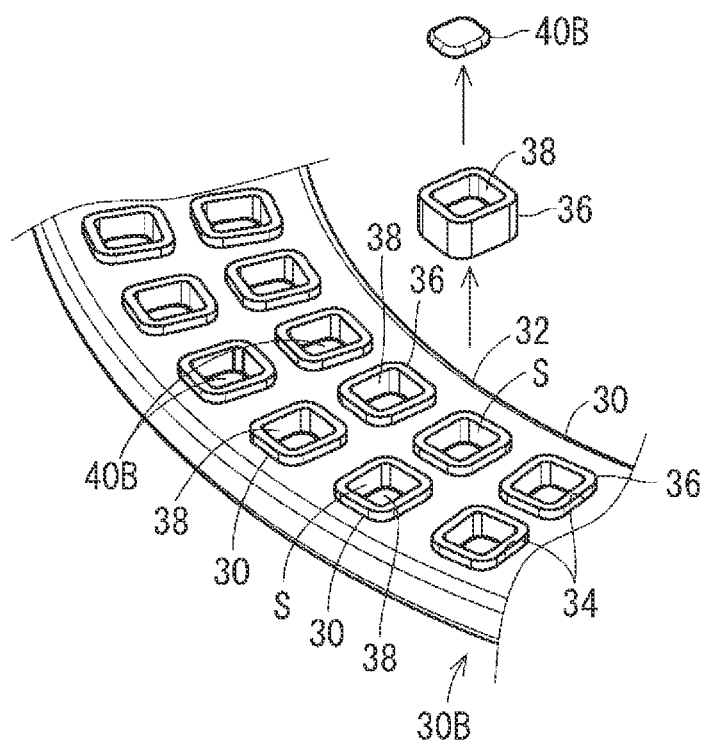
FIG. 5 is a perspective view of a solder jointing part as seen from a coil wire side.

In the present embodiment, the solder hardening space S is a space formed within the recessed portion 38 in the solder jointing part 30. The solder jointing part 30 will now be described. FIG. 5 is a perspective view of the solder jointing part 30 as seen from the coil wire 16 side. In FIG. 5, a cap 36 and a solder 40B removed from a holder 32 are shown.

As shown in FIGS. 1 to 5, the solder jointing part 30 has a recessed portion 38 into which a set of at least two connection end portions 17 to be connected to each other are insertable. The recessed portion 38 may be set to a size into which the set of at least two connection end portions 17 can be press-fit or inserted without play. That is, the size of the recessed portion 38 in the direction in which the set of at least two connection end portions 17 are arranged side by side and in the direction orthogonal to the aforementioned direction may be the set to the same dimensions as or smaller than the set of at least two connection end portions 17. In a state where at least two connection end portions 17 are inserted into the recessed portion 38, the at least two connection end portions 17 are thereby easily kept in contact with each other.

Note that, ultimately, the at least two connection end portions 17 are joined by the hardened solder portion 40, and thus the at least two connection end portions 17 may be inserted into the recessed portion 38 with a gap provided around the inner periphery of the recessed portion 38.

The hardened solder portion 40 joins at least two of the connection end portions inside the recessed portion 38. For example, the hardened solder portion 40 may include a portion 40a located between the distal end face of the at least two connection end portions 17 and the innermost portion of the recessed portion 38. In this case, the hardened solder portion 40 electrically connects the at least two connection end portions 17, due to the portion 40a being joined to the distal end faces of the at least two connection end portions 17. The hardened solder portion 40 may include a portion 40b that is interposed between the at least two connection end portions 17. In this case, the hardened solder portion 40 electrically connects the at least two connection end portions 17, due to the portion 40*b* being joined to the opposing surfaces of the at least two connection end portions 17. Note that, in FIG. 3, the gap between the at least two connection end portions 17 is depicted in an exaggerated manner. In actuality, the gap between the connection end portions 17 is minute, or there may only be a partial gap between the portions of the connection end portions 17 that oppose each other.

The hardened solder portion 40 is able to keep the at least two connection end portions 17 from moving apart from each other, by being joined to the surfaces of the at least two connection end portions 17. In this respect, the hardened solder portion 40 is able to keep the at least two connection end portions 17 in a mechanically joined state. The at least two connection end portions 17 are, of course, also kept from moving away from each other due to being inserted into the recessed portion 38.

In the present embodiment, the solder jointing part 30 is formed in a ring shape along ring-shaped lines on which a plurality of sets of at least two connection end portions 17 are lined up. The width of the solder jointing part 30 in the radial direction of the stator core 14 is formed wider than a width encompassing the above-described two ring-shaped lines in a plane.

In the solder jointing part 30, a plurality of recessed portions 38 are respectively formed in correspondence with each of the plurality of sets of at least two connection end portions 17. More specifically, a plurality of recessed portions 38 are lined up at an interval from each other in the circumferential direction of the stator core 14. Also, the plurality of recessed portions 38 are lined up along the outer peripheral ring-shaped line and the inner peripheral ring-shaped line.

Thus, when the solder jointing part 30 is moved closer to the connection end portions 17 of the coil wires 16, the plurality of sets of at least two connection end portions 17 can be collectively inserted into the plurality of recessed portions 38 corresponding thereto. It is not essential for a plurality of recessed portions 38 to be formed in the solder jointing part 30, and one recessed portion may be formed in the solder jointing part.

Also, the solder jointing part 30 includes the cap 36 in which the recessed portion 38 is formed and the holder 32 in which a set recessed portion 34 (set recess) capable of holding the cap 36 is formed.

The cap 36 is formed in a bottomed tube shape in which one side in the axial direction is open and the other side is closed. The recessed portion 38 is formed inside the cap 36.

The holder 32 is formed in a ring shape along the ring-shaped lines on which the plurality of sets of at least two connection end portions 17 are lined up. The width of the solder jointing part 30 in the radial direction of the stator core 14 is formed to be wider than the width encompassing the two ring-shaped lines in a plane.

In the holder 32, the set recessed portion 34 is formed at a position where the recessed portion 38 is to be formed, that is, at positions respectively corresponding to the plurality of sets of at least two connection end portions 17. Here, the set recessed portion 34 is a bottomed recessed portion that is open on one side. The set recessed portion 34 may also be a hole that passes through the holder 32. In this case, a positioning raised portion or a stepped portion capable of positioning the cap 36 in the axial direction may be formed on the inner peripheral surface of the set recessed portion 34.

The inner peripheral surface of the set recessed portion 34 is formed in a shape that conforms to the outer peripheral surface of the cap 36. At least part of the cap 36 is housed inside the set recessed portion 34, with the closed end portion on the other side of the cap 36 located on the bottom side of the set recessed portion 34. The cap 36 is thereby supported at a fixed position by the holder 32. In the present embodiment, the end portion on the open side of the cap 36 protrudes from the holder 32. The end portion on the open side of the cap 36 may also be continuous with the surface of the holder 32 in a flush state or may be positioned lower than the surface of the holder 32.

Any suitable material can be used for the cap 36 and the holder 32. The cap 36 preferably has heat resistance that can withstand molten solder. The cap 36 may, for example, be made of a material having a higher melting point than the melting point of the hardened solder portion 40, such as iron or another metal, for example.

By making the cap 36 from metal, the dimensional accuracy of the recessed portion 38 is easily improved to an extent that at least two connection end portions 17 can be press-fit into the recessed portion 38 or can be inserted without play. Also, the shape of the recessed portion 38 can be maintained, withstanding the heat of the molten solder. Thus, the molten solder can be easily kept in a fixed shape while maintaining at least two connection end portions 17 inside the recessed portion 38.

The holder 32 need only be able to help in keeping the plurality of caps 36 in a fixed positional relationship for the period until the at least two connection end portions 17 are inserted into the recessed portions 38. From this perspective, the holder 32 may be made of resin.

For example, the holder 32 may be a molded resin part, with the caps 36 used as insert parts. Also, the holder 32 may be a molded part that is molded into a shape having the set recessed portions 34, and the caps 36 may be press-fit into the set recessed portions 34 after molding.

The solder 40B before forming the hardened solder portion 40 is desirably disposed inside the recessed portion 38. Any suitable configuration for disposing the solder 40B inside the recessed portion 38 may be adopted. For example, the solder 40B may be a solder paste disposed deep inside the recessed portion 38. The solder 40B may also be a solid solder disposed inside the recessed portion 38 by press-fitting or the like.

The solder jointing part 30 with the solder 40B set therein may be regarded as a solder-incorporated solder jointing part 30B.

The solder 40B becomes the hardened solder portion 40 by melting and hardening.

An example of manufacturing the coil wire module 28 will now be described.

First, the solder-incorporated solder jointing part 30B in which the solder 40B is disposed inside the recessed portions 38 is prepared.

Figure 6:
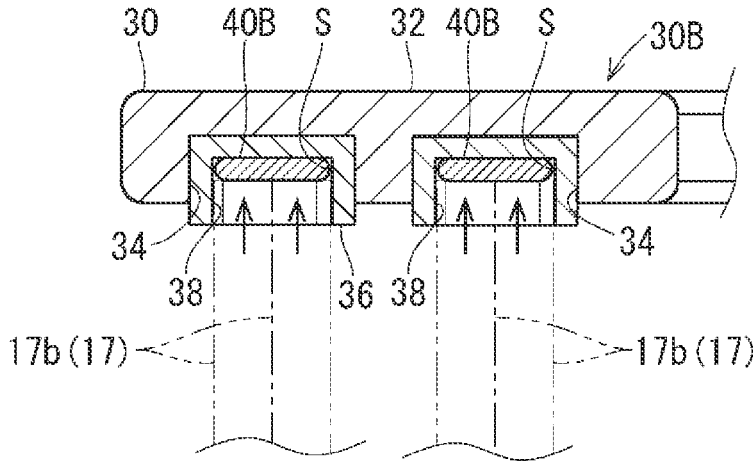
FIG. 6 is a diagram showing a state in which connection end portions are inserted into recessed portions.

As shown in FIG. 6, at least two connection end portions 17 of the plurality of coil wires 16 provided in the stator core 14 are then inserted into each recessed portion 38. Here, a plurality of sets of at least two connection end portions 17 are collectively inserted into corresponding recessed portions 38. In this state, the at least two connection end portions 17 are kept butted against each other in each recessed portion 38. Also, in each recessed portion 38, the solder 40B is sandwiched between the distal end face of the at least two connection end portions 17 and the innermost portion of the recessed portion 38.

The solder 40B is melted in this state. Any suitable method of melting the solder 40B may be employed.

For example, a large current may be temporarily passed through the coil wires 16 and the solder 40B may be melted due to the heat generated by the resistance of the contact portions between the at least two connection end portions 17. In this case, the heat of the solder 40B is transmitted to the holder 32 via the caps 36. Thus, the heat resistance of the holder 32 need not be high, enabling increased freedom when selecting a material for constituting the holder 32.

Also, for example, the coil wires 16 and the solder-incorporated solder jointing part 30B may be placed inside a heating furnace and temporarily heated as a whole to melt the solder 40B.

The molten solder can fill the space between the at least two connection end portions 17 and the recessed portion 38 and form the portion 40a. Also, depending on the solder wettability of the surfaces of the at least two connection end portions 17, the molten solder can also enter the gap between the at least two connection end portions 17 and form the portion 40b. The molten solder thereby forms the hardened solder portion 40, and the at least two connection end portions 17 can be soldered together inside the recessed portion 38.

With the coil wire module 28 constituted in this way, the hardened solder portion 40 is formed by the solder 40B melting inside the solder hardening space S within the recessed portion 38 and hardening to join at least two connection end portions 17 together. Since at least two connection end portions 17 are connected by this hardened solder portion 40, connection between the coil wires 16 is facilitated. Also, at least two connection end portions 17 are inserted into each recessed portion 38, and thus, even if the positional accuracy between the at least two connection end portions 17 is poor, the at least two connection end portions 17 will be soldered together in a positionally restricted state within the recessed portion 38. Thus, the task of connecting at least two connection end portions 17 can be performed while absorbing the position tolerance between the at least two connection end portions 17.

Also, the coil wire module 28 includes the solder jointing part 30 having the recessed portion 38, and the hardened solder portion 40 joins at least two connection end portions 17 inside the recessed portion 38. Thus, if the solder 40B is housed inside the recessed portion 38 and the solder 40B is melted while at least two connection end portions 17 are inserted into the recessed portion 38, connection between the connection end portions 17 is facilitated.

Also, a plurality of recessed portions 38 are formed in the solder jointing part 30, and thus, when the solder jointing part 30 is moved closer to the coil wires 16, a plurality of sets of at least two connection end portions 17 are collectively inserted into the corresponding recessed portions 38. In each recessed portion 38, at least two connection end portions 17 can then be joined by the hardened solder portion 40, and, accordingly, a plurality of sets of at least two connection end portions 17 can be easily joined.

Also, by constituting the cap 36 in which the recessed portion 38 is formed as a separate part from the holder 32, the cap 36 is easily constituted to be suitable for soldering. For example, by making the cap 36 from metal, the recessed portion 38 is easily formed with an accuracy suitable for inserting and holding the at least two connection end portions 17. Also, the portion surrounding the recessed portion 38 is easily provided with heat resistance to withstand melting of the solder.

Also, since the hardened solder portion 40 includes the portion 40a located in the innermost portion of the recessed portion 38, the at least two connection end portions 17 can be easily and reliably connected deep inside the recessed portion 38.

Also, by using the solder-incorporated solder jointing part 30B, the at least two connection end portions 17 can be easily joined by the solder 40B inside the recessed portion 38 while holding the at least two connection end portions 17 together within the recessed portion 38.

Modifications

Note that, after joining the at least two connection end portions 17 with the hardened solder portion 40 inside the recessed portion 38, the cap 36 may be removed from the holder 32 with the cap 36 still attached to the end portions of the at least two connection end portions 17. In this case, the cap 36 is desirably fitted into the set recessed portion 34 so as to be removable.

For example, the motor 10 may be used with the cap 36 fitted into the holder 32, and the holder 32 may be detached during maintenance or the like. The motor 10 may also be used with the holder 32 detached. At this time, for example, if the entirety or outer peripheral portion of the cap 36 is made of an insulating member such as resin, the set of at least two connection end portions 17 can be more reliably kept in an insulated state by the cap 36.

Also, if the cap 36 is to be attached to the at least two connection end portions 17, the cap 36 may be made of a material having good wettability to solder.

When the motor 10 is in use or during maintenance, the cap 36 may be removed from the at least two connection end portions 17 and the hardened solder portion 40. In this case, the cap 36 is desirably made of a material having poor wettability to solder. The cap 36 may be removed from the at least two connection end portions 17 and the hardened solder portion 40 together with the holder 32.

Note that the configurations described in the embodiment and the modifications can be combined as appropriate as long as there are no mutual inconsistencies.

The invention claimed is:

1. A coil wire module for a rotating electric machine, the coil wire module comprising:
   a plurality of coil wires that are configured to be provided in a core of the rotating electric machine, each coil wire having a connection end that is configured to be exposed from an end of the core;
   a solder jointing part having a recess into which at least two of the connection ends of the plurality of coil wires are inserted, the solder jointing part having a ring shape that follows a circumference of the core; and
   a hardened solder that joins the at least two of the connection ends together inside the recess.

2. The coil wire module according to claim 1, wherein:
   the connection ends include a plurality of sets of the connection ends that are lined up at an interval from each other in a circumferential direction of the core, and
   in the solder jointing part, the recess is a plurality of recesses that are respectively formed in correspondence with the sets of the connection ends.

3. The coil wire module according to claim 1,
   wherein the solder jointing part includes:
   a cap in which the recess is formed; and
   a holder in which a set recess capable of holding the cap is formed.

4. The coil wire module according to claim 1,
   wherein the hardened solder includes a portion located between a distal end face of the at least two of the connection ends and an innermost portion of the recess.

5. A solder-incorporated solder jointing part for joining connection ends of a plurality of coil wires that are configured to be provided in a core of a rotating electric machine, the solder jointing part comprising:

a cap in which a recess is formed, the recess being configured to receive at least two of the connection ends;

a holder into which the cap is recessed; and a solder disposed inside the recess.

6. A manufacturing method for a coil wire module, comprising:

inserting a plurality of sets of connection ends of a plurality of coil wires that are provided in a core of a rotating electric machine into a corresponding plurality of recesses of a solder-incorporated solder jointing part, the sets of connection ends being lined up at an interval from each other in a circumferential direction of the coil wire module, each recess having a solder disposed therein; and melting the solder in the recesses by heat, thereby soldering the sets of connection ends together inside the recesses.

\* \* \* \* \*